(12) United States Patent
Brinkmann (10) Patent No.: US 9,683,380 B2
(45) Date of Patent: Jun. 20, 2017

(54) STANDARD AND LEDGER OF A SCAFFOLDING SYSTEM, AND METHOD FOR ERECTING THE SAME

(75) Inventor: Franciscus Jozef Leonardus Hubertus Brinkmann, Budel (NL)

(73) Assignee: Scafom International B.V., Budel (NL)

(*) Notice: Subject to any disclaimer, the term of this patent is extended or adjusted under 35 U.S.C. 154(b) by 0 days.

(21) Appl. No.: 14/005,001

(22) PCT Filed: Mar. 22, 2012

(86) PCT No.: PCT/NL2012/050180
§ 371 (c)(1),
(2), (4) Date: Nov. 19, 2013

(87) PCT Pub. No.: WO2012/128630
PCT Pub. Date: Sep. 27, 2012

(65) Prior Publication Data
US 2014/0321908 A1    Oct. 30, 2014

(30) Foreign Application Priority Data
Mar. 22, 2011  (NL) ...................................... 2006450

(51) Int. Cl.
*E04G 7/32*  (2006.01)
*E04G 7/30*  (2006.01)
*E04G 1/12*  (2006.01)

(52) U.S. Cl.
CPC .............. *E04G 7/302* (2013.01); *E04G 1/12* (2013.01); *E04G 7/307* (2013.01); *E04G 7/32* (2013.01);
(Continued)

(58) Field of Classification Search
CPC  E04G 7/302; E04G 7/32; E04G 7/307; E04G 7/301
See application file for complete search history.

(56) References Cited

U.S. PATENT DOCUMENTS 4,269,531 A * 5/1981 Brolin ............................. 403/97
6,062,341 A    5/2000 Frank et al.
(Continued)

FOREIGN PATENT DOCUMENTS

DE  3121141 A1 * 12/1982
FR  1262629 A     6/1961
(Continued)

OTHER PUBLICATIONS

International Search Report—PCT/NL2012/050180—Mailing Date: May 14, 2012.

*Primary Examiner* — Alvin Chin-Shue
(74) *Attorney, Agent, or Firm* — Banner & Witcoff, Ltd.

(57) ABSTRACT

A standard (10) of a scaffolding system (1), comprising an elongate tubular wall (12), having a central longitudinal axis ($L_s$), and at least one supporting projection (14) that protrudes radially outwardly from said tubular wall (12). When the standard (10) is in a vertical orientation, the supporting projection (14), seen in a tangential direction ($T_s$) relative to the longitudinal axis ($L_s$), forms an annular supporting surface (16) that encircles the tubular wall (12) and that defines alternating elevations (18) and depressions (20). Also disclosed is a ledger (30) with ledger couplings (40) configured for cooperation with said standard (10).

14 Claims, 7 Drawing Sheets

(52) U.S. Cl.
CPC .... *Y10T 29/49826* (2015.01); *Y10T 403/7039* (2015.01)

(56) References Cited

U.S. PATENT DOCUMENTS

| | | | | |
|---|---|---|---|---|
| 6,318,572 | B1* | 11/2001 | Lai ................................. | 211/196 |
| 7,530,540 | B2* | 5/2009 | Long et al. ................ | 248/230.1 |
| 2002/0094228 | A1* | 7/2002 | Krauss ............................ | 403/84 |
| 2012/0228060 | A1* | 9/2012 | Rogers ....................... | 182/178.5 |

FOREIGN PATENT DOCUMENTS

| | | |
|---|---|---|
| GB | 1278243 A | 6/1972 |
| NL | 2003206 C | 1/2011 |
| WO | 2011/008094 A1 | 1/2011 |

\* cited by examiner

STANDARD AND LEDGER OF A SCAFFOLDING SYSTEM, AND METHOD FOR ERECTING THE SAME

CROSS-REFERENCE TO RELATED APPLICATIONS

This application is a U.S. National Stage application under 35 U.S.C. §371 of International Application PCT/NL2012/050180 (published as WO 2012/128630 A1), filed Mar. 22, 2012, which claims priority to Application NL 2006450, filed Mar. 22, 2011. Benefit of the filing date of each of these prior applications is hereby claimed. Each of these prior applications is hereby incorporated by reference in its entirety.

FIELD OF THE INVENTION

The present invention relates to a standard and a ledger for a scaffolding system, and to a method for erecting a scaffolding system.

BACKGROUND

Modular scaffolding systems may comprise a limited number of different building elements that can be connected together in large numbers to form a variety of scaffold frames that can be tailored to specific sites and applications. A modular scaffold frame may typically comprise a plurality of standards (also called uprights), ledgers and cross-braces. The standards are connected to form vertically extending columns that are spaced apart at regular intervals. Horizontally oriented ledgers interconnect the columns at different height levels to form a more or less regular framework. Points where ledgers connect to standards are called nodes. The cross-braces may diagonally interconnect these nodes, either connecting nodes of the same height level or connecting nodes of different levels, in order to increase the rigidity of the scaffold frame.

Individual ledgers of a scaffolding system may be connected to individual standards through a coupling construction. Known coupling constructions have a number of drawbacks that inhibit the quick erection of a scaffold frame. U.S. Pat. No. 4,044,523, for example, discloses a scaffold frame including a plurality of tubular standards of circular cross-section, each standard including a number of axially spaced ring flanges. The ring flanges are concentric with the respective standards and are each formed with circumferentially distributed cut-outs of different shapes. A plurality of ledgers interconnect the respective standards. Each ledger has two end portions or couplings, while each coupling is formed with an axial slot having a width at least equal to the thickness of the respective ring flanges, and subdividing the respective coupling into two sections provided with registering openings extending normal to the elongation of the respective ledger. A releasable wedge member extends through these openings across the slot and through one of the cut-outs of a ring flange which is in part located in the slot.

In the scaffolding system of U.S. Pat. No. '523, a coupling construction involves a ring flange (connected to a standard), a coupling (connected to an extremity of a ledger), and a wedge member. Assembling a scaffold frame with such coupling constructions may repeatedly require a scaffolding builder to mount a ledger between two standards. While balancing the ledger between the standards, he has to insert a portion of the respective ring flanges provided thereon into the slots in the respective couplings at the extremities of the ledger. Once he has succeeded in doing so, he may turn to either coupling and bring the openings in the respective coupling into alignment with one of the various cut-outs in the respective ring flange. To achieve alignment he may have to jiggle the respective extremity of the ledger, which may also cause the opposite extremity, which is still loosely supported on the respective ring flange, to shift and fall off. Only when he has carefully selected the desired cut-out, and moved the coupling openings into alignment therewith, he may insert a wedge member trough the aligned cut-out and openings to lock the respective ledger end to the standard.

It will be appreciated that the acts of initially placing the ledger between two standards so that it is loosely supported on two ring flanges, and of jiggling the ledger to select the desired cut-out and to bring the openings in the coupling in registry therewith, while at the same time preventing the opposite end of the ledger from shifting and falling, are relatively time consuming and require skill on the part of the scaffold builder. In addition, falling ledgers may injure the scaffold builder, which renders the ledgers unsafe in use.

It is an object of the present invention to overcome or mitigate one or more of these drawbacks associated with known scaffolding systems, and to provide for a coupling construction that facilitates the task of quickly and safely erecting a scaffold frame.

SUMMARY OF THE INVENTION

A first aspect of the present invention is directed to a standard of a scaffolding system. The standard includes an elongate tubular wall, having an imaginary central longitudinal axis. The standard also includes at least one supporting projection that protrudes radially outwardly from said tubular wall. Seen in a tangential direction relative to the longitudinal axis when the standard is in a vertical orientation, the supporting projection forms an annular supporting surface that encircles the tubular wall and that defines alternating elevations and depressions.

When the standard is in its normal, substantially vertical use orientation, an upper surface of the supporting projection forms an annular supporting surface configured to support a ledger extremity provided with a ledger coupling. The supporting surface may be considered to be a potential energy surface, and its elevations and depressions may be regarded as gravitational potential hills and gravitational potential valleys. Both the hills and the valleys are positively defined by the vertical level of the surface (instead of by the absence thereof); so are the flanks. In general, the annular configuration of the undulating supporting surface ensures that, if during the assembly of a scaffold frame an extremity of a ledger is placed on any given point of the upper surface of the supporting projection, it may be guided by gravity, over the supporting surface, towards the nearest depression. There the ledger's extremity is gravitationally trapped and prevented from accidentally moving sideways and falling off of the supporting projection. In case the supporting surface defines elevated plateaus on which the ledger extremity may be supported, a combination of jiggling and gravitational action may guide the extremity into the nearest depression. Accordingly, the tasks of a scaffolding builder to select a desired ledger mounting position, and to safely maintain a ledger extremity at said mounting position while securing an opposite ledger extremity are greatly facilitated. The ledger extremity need only be placed roughly at the desired position; the configuration of the supporting projection then promotes the precise localization of the desired mounting position, and subsequently prevents the ledger extremity from escaping therefrom.

The terms 'elevation' and 'gravitational potential hill' refer to a local maximum/high of the supporting surface, and where appropriate also to the surface region immediately adjacent thereto. Similarly, the terms 'depression' and 'gravitational potential valley' refer to a local minimum/low of the supporting surface, and where appropriate also to the surface region immediately adjacent thereto. The term 'flank' is used to refer to a portion of the supporting surface that interconnects an elevation and a depression. The term 'flanked elevation' refers to an elevation including the flanks that define it, while the term 'flanked depression' refers to a depression including the flanks that define it.

In one embodiment of the standard, the supporting projection may be manufactured separately from the tubular wall of the standard, and be connected, e.g. welded, thereto at a later stage of the production. Such an embodiment, however, has the disadvantage that it is rather laborious to produce. In addition, attaching multiple separately manufactured supporting projections to a standard may significantly add to the weight (per unit of length) thereof, thus diminishing the ease with which the standard may be handled manually during erection and disassembly of a scaffold frame. Furthermore, additional finishing operations may be required due to the fact that the welding process may introduce internal stresses into the tubular wall.

These drawbacks can be overcome by forming a supporting projection through plastic deformation of the tubular wall of the standard, in particular through upsetting the tubular wall.

A process for forming an upset supporting projection may for example include: providing a standard having a tubular wall; securing the standard against axial movement, e.g. by grasping it in a fixture; providing external support for the tube along regions where a radially outwardly protruding flange is not desired, while not providing external support for the tube along regions where a radially outwardly protruding flange is desired; and applying an axial compression force to the tubular wall, causing portions thereof to buckle outwardly at the externally unsupported regions. The externally unsupported regions along which a radially outwardly protruding flange is desired may reflect the undulating form of the support surface to be defined by the supporting projection, and thus for example describe a periodic waveform.

In one embodiment of the standard, the supporting surface may undulate according to a periodic waveform that extends along the circumference of the tubular wall. The periodic wave may preferably have a periodic length (i.e. a length as seen in the tangential direction with respect to the longitudinal axis of the standard) that is a fraction (1/p) of the circumference, p being a positive integer. Phrased otherwise, the periodic length of the wave may preferably be chosen such that it fits onto the circumference of the tubular wall of the standard an integer multiple times, e.g. two, three or four times.

Several waveforms are envisaged, including sinus, triangle, saw tooth and square waveforms. In one embodiment of the standard the supporting surface defines a generally sinusoidal or triangular waveform. Sinusoidal and triangular waveforms have the advantage that they gently guide an extremity of a ledger supported thereon towards the nearest depression, irrespective of the point on the supporting surface on which the extremity is first supported. In addition, they may enable a properly shaped extremity of a ledger to be 'wedged between' the sloping flanks of a depression, without relying on support from the depression itself. This is advantageous, as a depression may accumulate dirt, which can prevent a ledger extremity from fully sinking into the depression. A drawback of sinusoidal and triangular waveforms, however, is that their sloping flanks may allow a firm horizontal push against a (yet unsecured) ledger extremity that is being connected to the standard to force the ledger from the depression in which it is trapped. This is in particular true when the amplitude of the waveforms is relatively shallow. The problem may be overcome by using a supporting surface that defines a generally square waveform instead. The flanks of a square waveform run substantially parallel to the longitudinal axis of the standard and are steep enough to prevent an extremity of a ledger trapped in a potential valley from being pushed out by a horizontal thrust.

For optimal functionality the supporting projection, including the supporting surface it defines, may preferably have certain minimum characterizing dimensions. For instance:

The supporting projection may preferably protrude from the (axially adjacent) tubular wall over a distance in the range of 5-30 mm, and more preferably in the range of 10-25 mm, to facilitate the initial ledger mounting step of loosely supporting a ledger on supporting projections of two neighboring standards. Supporting projections that protrude less than 5-10 mm may easily become dysfunctional in the case of slightly deformed standards. Supporting projections that protrude more than about 25-30 mm significantly complicate storage of the standards: when the standards are stacked on each other, the supporting projections of one standard may catch on those of another standard to block relative sliding motion of the standards, so that taking a standard from the stack becomes unnecessarily laborious.

The distance between two adjacent elevations of the supporting surface of a supporting projection may preferably be at least 3 cm. A greater distance generally allows for gentler guiding flanks that promote the automatic selection of a nearby depression during mounting of a ledger. Furthermore, correspondingly wider depressions diminish the sensitivity to inaccurate placement of a ledger extremity on the supporting projection, and are therefore more forgiving. A minimum distance of 3 cm has been found to work satisfactorily for at least sinusoidal or triangular waveforms. The maximum distance between adjacent elevations is naturally limited by the circumference of the tubular wall of the standard, and the desired number of depressions to be present along that circumference.

The depression-to-elevation amplitude of the waveform—in signal theory commonly referred to as the peak-to-peak amplitude—may preferably be at least 0.5 cm, and more preferably at least 1 cm, to define a depression or potential valley that is sufficiently deep to reliably trap and secure the extremity of a ledger in an otherwise unsecured condition.

According to an elaboration of the invention, each of the elevations or depressions of the at least one supporting projection may be associated with a keeper projection. When the standard is in a vertical use orientation, the keeper projection may be located axially above the respective associated elevation or depression.

The keeper projection is an optional feature that may in particular be combined with supporting projections defining a supporting surface with gently sloping flanks and relatively shallow depressions. Although such a supporting surface presents an improvement over the prior art in its ability to aid in selecting a nearby ledger mounting position (typically in the form of a depression), and in trapping the ledger extremity at such a position, the rough treatment of a ledger that is sometimes required to force it into place between two standards may exceed the level of release-resistance that the supporting projection is dimensioned to provide. Thus, in such cases, a yet unsecured and freely supported ledger extremity may occasionally be pushed out of contact with the supporting projection, fall, and possibly injure a scaffold builder.

This problem may be overcome by associating a keeper projection with each of the elevations or depressions of a supporting projection. A ledger coupling that makes use of a keeper projection may complementarily be provided with a keeper projection recess or slot, configured to fittingly receive the keeper projection of the standard. Upon reception of the keeper projection by the keeper projection recess/slot, the coupling is at least translationally fixed relative to the standard. The keeper projection may typically take the form of a small, generally semi-spherical stud. Alternatively, the keeper projection may be formed as a prismatic, angular projection capable of additionally limiting rotational freedom relative to its axis. Note however, that the rotational freedom of a ledger will generally also be limited by the fact that its extremity is received in a flanked depression of the supporting surface. A corresponding keeper projection recess or slot in a ledger coupling may preferably be shaped such that the keeper projection is receivable therein via relative motion in the axial direction of the standard to which the ledger is to be connected. Accordingly, connection of the ledger coupling to the standard and removal of the ledger coupling from the standard may require a scaffold builder to (slightly) vertically lift the ledger coupling, which effectively prevents accidental disconnection of the ledgers and thus greatly improves the safety of the scaffold builder. It may be preferable to arrange a keeper projection axially above the flanked elevation or depression with which it is associated, but this is not necessary. For example, when relatively wide ledger extremities/couplings are used, a keeper projection associated with a depression in which the ledger coupling is to be trapped may be arranged axially above one of the elevations adjacent said depression.

According to a further elaboration of the invention, the at least one supporting projection on the standard may define at least two, and preferably two or four, depressions. Each two depressions of the at least one supporting projection may be mutually offset in the tangential direction by (n·90) degrees, n being a positive integer in the range of 1-3.

Typical scaffold frame configurations employ ledgers that radiate from a respective standard at right angles, or multiples thereof. That is, two ledgers connected to the same standard at the same supporting projection may typically include an angle of 90, 180 or 270 degrees. To facilitate such a configuration, two or more depressions—four will usually suffice and enable optimal configurability of the scaffold frame—of the supporting surface may preferably be provided at offsets of (n·90) degrees, n being a positive integer in the range of 1-3. An important advantage of having the depressions, and generally also the elevations, at regular intervals along the circumference of the standard is that the supporting projections may aid in erecting a regularly aligned scaffold. The standards and the ledgers connected thereto will tend to conform to the alignment dictated by the configuration of the supporting surface. This means, for example, that when two ledgers are connected to a standard at diametrically opposite sides thereof (such that they include an angle of approximately 180 degrees, and their longitudinal axes are in approximate alignment), these ledgers will tend to force the standard in an orientation that brings the depressions in which their extremities are trapped into alignment with their own longitudinal axes, and vice versa. This is a consequence of the fact that perfect alignment—in which the ledgers and the depressions receiving their extremities are arranged on the same imaginary line—represents a (gravitational) potential energy minimum for the node as a whole.

To enable the connection of ledgers at different axial positions of the standard, a plurality of substantially identical supporting projections may be regularly spaced apart along the longitudinal direction of the standard, for example at mutual distances in the range of 200-600 mm, e.g. 250 mm or 500 mm. The supporting projections may preferably be arranged such that the elevations and depressions of all supporting surfaces on the same standard are in axial registry with each other. In this way, ledgers connected to the standard at different axial positions but corresponding tangential positions will all neatly extend in the same direction.

It will be clear from the above that the supporting surface of a supporting projection, and in particular the elevations and depressions defined by the supporting surface, is configured for cooperation with an extremity of a ledger, which is generally formed by a ledger coupling.

Accordingly, a second aspect of the present invention is directed to a ledger of a scaffolding system. The ledger may include an elongate tubular wall, having a central longitudinal axis, and at least one ledger coupling, connected to the elongate tubular wall at an extremity thereof. The ledger coupling may include a foot that is configured to be supported on the supporting surface of a supporting projection of a standard according to the first aspect of the present invention, and that has a contour complementary to a flanked elevation or depression of the supporting surface, such that the foot may be at least partially fittingly received on or in said flanked elevation or depression, respectively.

In one embodiment of the ledger, the foot of the ledger coupling may have a contour that may be at least partially fittingly received in a flanked depression of a supporting surface, preferably such that the foot—in a fully received state—only contacts the flanks of the depression and remains free of the depression itself. Such an embodiment is typically preferred since it allows gravity to guide the ledger coupling into a nearby depression, in which it may be wedgedly trapped. It is contemplated, however, that the foot of the ledger coupling may alternatively be provided with a contour that enables it to be fittingly received on top of a flanked elevation of a supporting surface. The foot may for example include a recess in a bottom surface, shaped to snugly accommodate an elevation and portions of the flanks that define it. Although such an embodiment does not provide the full benefit of the action of gravity—i.e. a scaffolding builder must push the ledger coupling up the flank of an elevation before it can be trapped in a meta-stable state on the top thereof—it does aid in the selection of a desired ledger mounting position and prevents a ledger coupling from sliding off the supporting surface once it is so trapped. Striving after optimal ease of use, this text focuses on the first, preferred embodiment of the ledger.

A further aspect of the present invention is directed to a method for erecting a scaffolding frame. The method includes providing a scaffolding system including at least one standard and at least one ledger according to the first and second aspects of the present invention. The method also includes arranging the standard in a substantially vertical orientation, and supporting the ledger coupling of the ledger on the supporting surface of the at least one supporting projection of the standard, thereby allowing gravity to slide the contour of the foot into fitting engagement with a flanked elevation or depression of said supporting surface.

These and other features and advantages of the invention will be more fully understood from the following detailed description of certain embodiments of the invention, taken together with the accompanying drawings, which are meant to illustrate and not to limit the invention.

DETAILED DESCRIPTION

Figure 1:
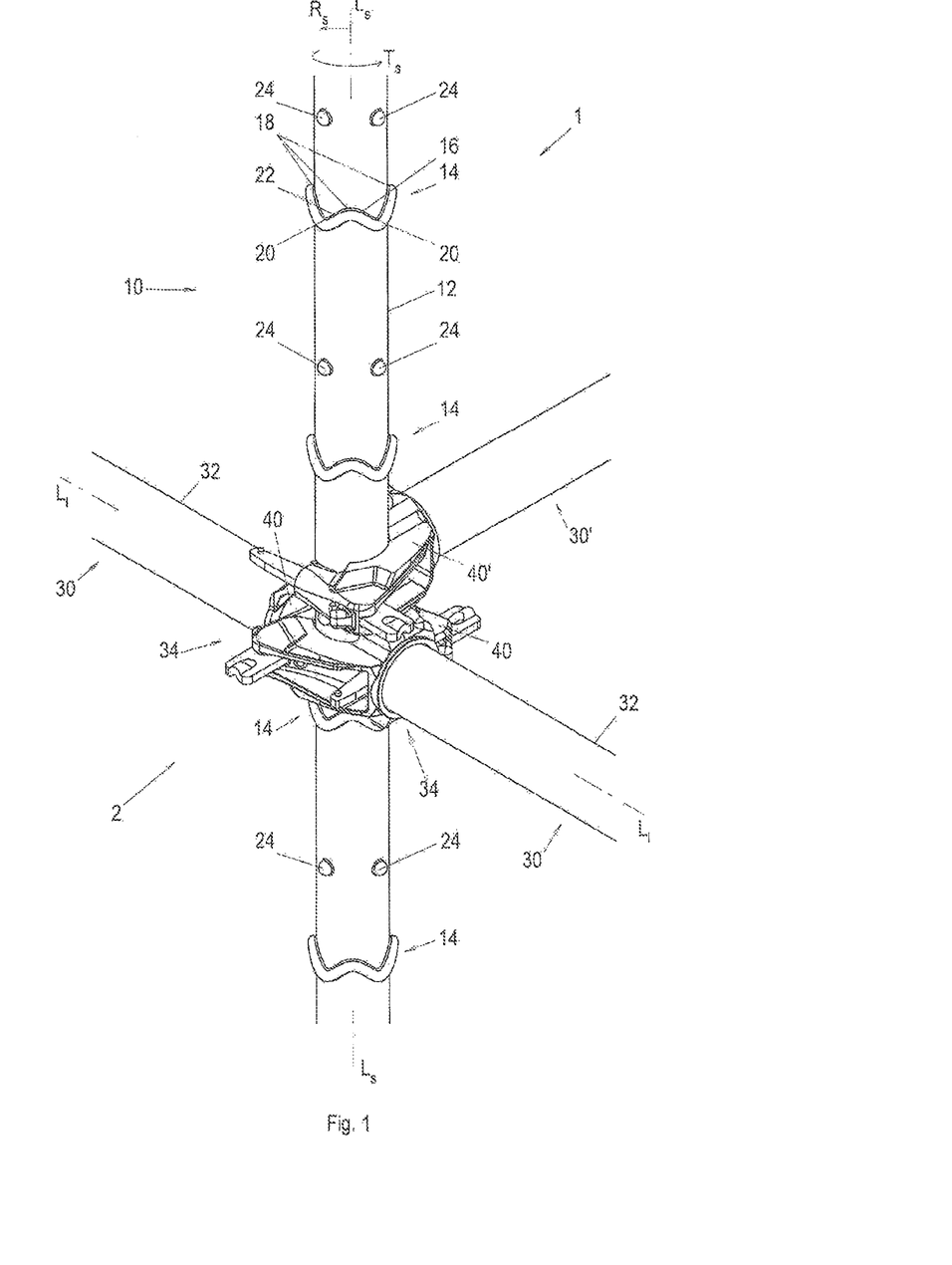
FIG. 1 is a schematic perspective view of a node of a first exemplary embodiment of a scaffolding system, wherein the standard has multiple axially spaced apart supporting projections each defining a supporting surface with a generally sinusoidal waveform.

FIG. 1 is a schematic perspective view of a node 2 of a first exemplary embodiment of a scaffolding system 1. The node 2 comprises a standard 10, two aligned ledgers 30, and a transverse ledger 30'. It is understood that a node 2 may alternatively be formed by a standard 10 and one first ledger 30, by a standard 10 and two first ledgers 30, by a standard 10 with a first ledger 10 and two second ledgers 30', or a standard with two first ledgers 30 and two second ledgers 30'.

The standard 10 of the scaffolding system 1, which extends along an imaginary central longitudinal axis $L_s$, includes an elongate tubular wall 12. In the depicted embodiment the tubular wall 12 is substantially cylindrical; it is contemplated, however, that alternative embodiments of the standard 10 may have a non-circular cross-sectional shape, for instance a regular polygonal shape. The standard 10, including the tubular wall 12, may be manufactured from metal, e.g. steel, sheet steel, or aluminum, or another suitable material.

The standard 10 may include one or more supporting projections 14, which may protrude from an external surface of the tubular wall 12, in a generally radially outward direction $R_s$ with respect to the central longitudinal axis $L_s$. In the depicted embodiment, the standard 10 includes multiple supporting projections 14 which are regularly spaced apart along the length of the standard, e.g. at regular distances of about 250 mm or 500 mm.

Each of the supporting projections 14 may extend circumferentially around the tubular wall 12 of the standard 10. When the standard 10 is in a vertical use orientation, an upper surface of each of the supporting projections 14 may define an annular supporting surface 16. Seen in a tangential direction $T_s$ relative to the central longitudinal axis $L_s$, this supporting surface may define alternating elevations 18 and depressions 20. Or phrased otherwise, the axial/vertical coordinate of the supporting surface 16 of a supporting projection 14 may vary in the tangential direction $T_s$.

In the embodiment of the standard 10 depicted in FIG. 1, each of the supporting projections 14 takes the form of a wavy ring that, as it extends along the circumference of the tubular wall 12, defines a supporting surface 16 which undulates according to a generally sinusoidal or triangular waveform. It is understood that, when embodied in metal, for example in the form of an upset flange, the ideally varying slopes of sinusoidal wave flanks may approximate the straight flanks of a triangular wave, while the ideally angular elevations/depressions of a triangular wave may approximate the arched elevations/depressions of a sinusoidal wave, such that these types of waveform may in practice appear quite similar. The terms 'generally sinusoidal' and 'generally triangular' are therefore to be construed as referring also to imperfect sinusoidal or triangular waveforms.

The periodic length of the waveform of the supporting surface 16 depicted in FIG. 1 is equal to about $¼^{th}$ of the circumference of the tubular wall 12, such that four substantially sinusoidal or triangular waves fit onto this circumference. Accordingly, the supporting surface 16 alternatingly defines four elevations 18 and four depressions 20. In alternative embodiments, the waveform of the supporting surface 16 may have a different periodic length, for example half of the circumference of the tubular wall 12. The different supporting projections 14 are arranged such that the elevations 18 and depressions 20 of their supporting surfaces 16 are in axial registry with each other. This facilitates the erection of a regular scaffold frame, and ensures that ledgers 30, 30' connected to the standard 10 at different axial positions radiate from the standard in the same respective directions.

A supporting projection 14 having a sinusoidal or triangular waveform as shown in FIG. 1 offers the advantage that it may gently guide an extremity of a ledger 30 supported thereon towards the nearest depression 20, irrespective of the point on the supporting surface 16 on which the extremity is first supported. A drawback of the sinusoidal and triangular waveforms, however, is that their sloping flanks may allow a firm horizontal push against a (not yet secured) ledger 30 that is still being connected to the standard 10 to force the ledger from the depression 20 in which it is trapped. This is in particular true when the amplitude of the waveforms is relatively shallow. The problem may be overcome by using a supporting surface 16 defining steeper flanks, such as a substantially square waveform, instead.

Figure 2:
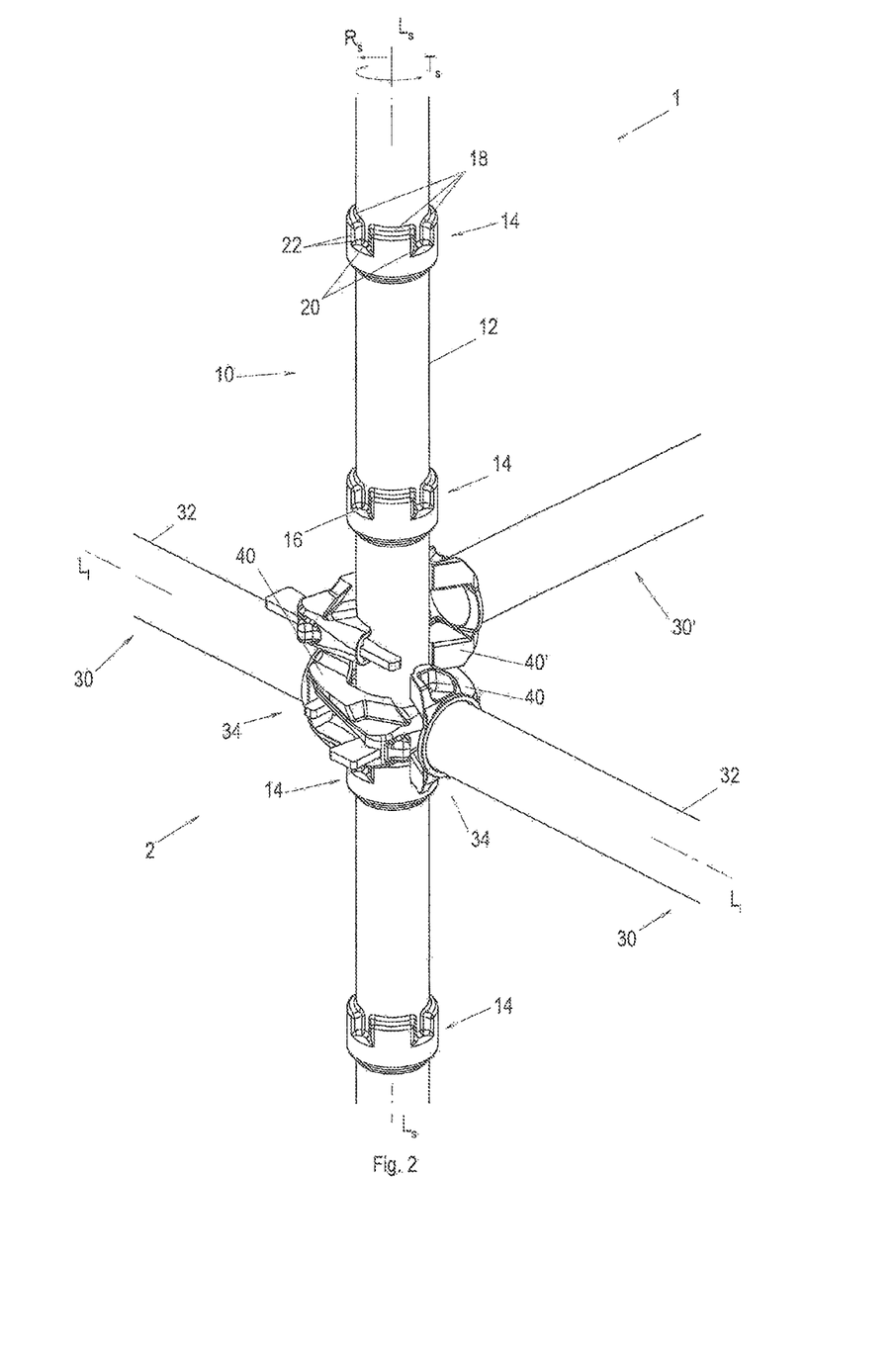
FIG. 2 is a schematic perspective view of a node of a second exemplary embodiment of a scaffolding system, wherein the standard has multiple supporting projections each defining a supporting surface with a generally square waveform.
Figure 3:
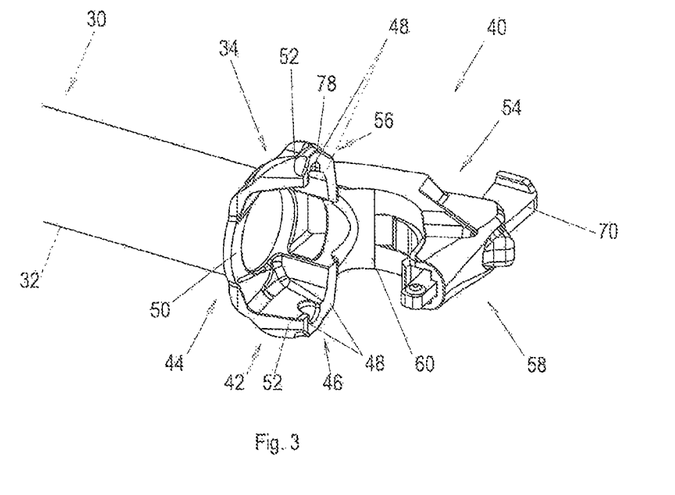
FIG. 3 is a schematic perspective view of an exemplary embodiment of a ledger extremity fitted with a ledger coupling suitable for use with the supporting projections of the standard shown in FIG. 1.
Figure 4:
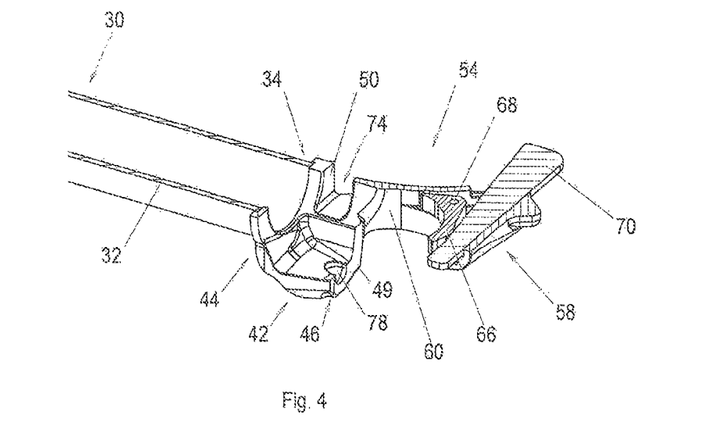
FIG. 4 is a schematic cross-sectional perspective view of the exemplary embodiment of the ledger extremity shown in FIG. 3.
Figure 5:
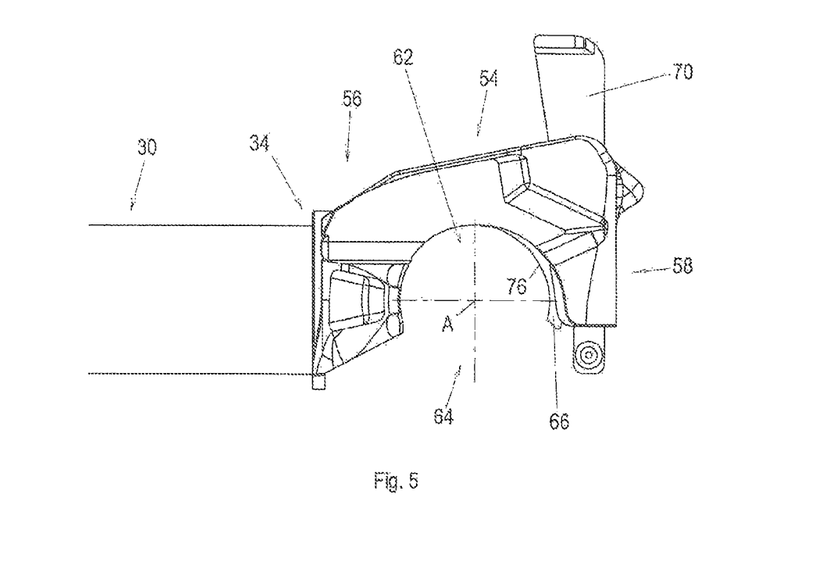
FIG. 5 is a schematic top view of the exemplary embodiment of the ledger extremity shown in FIG. 3.
Figure 6:
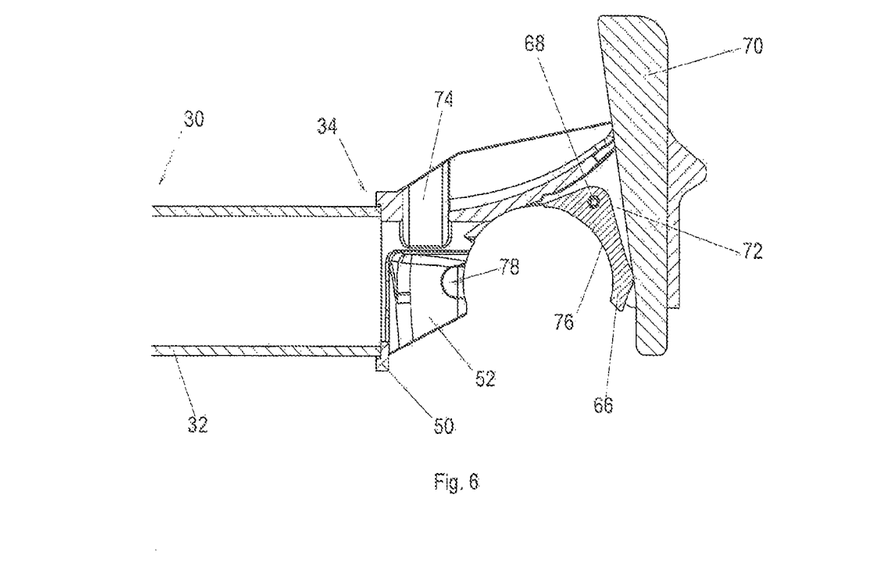
FIG. 6 is a schematic cross-sectional top view of the exemplary embodiment of the ledger extremity shown in FIG. 3.
Figure 7:
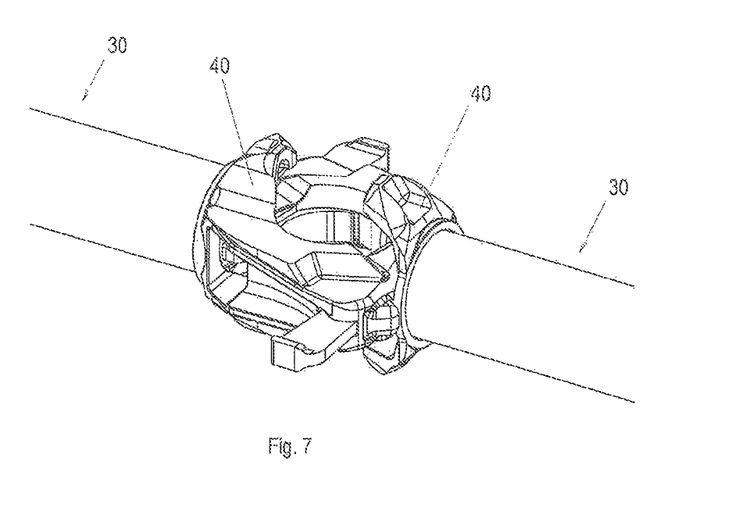
FIG. 7 is a schematic perspective view of two ledgers extremities as shown in FIGS. 3-6 in aligned engagement with each other.
Figure 8:
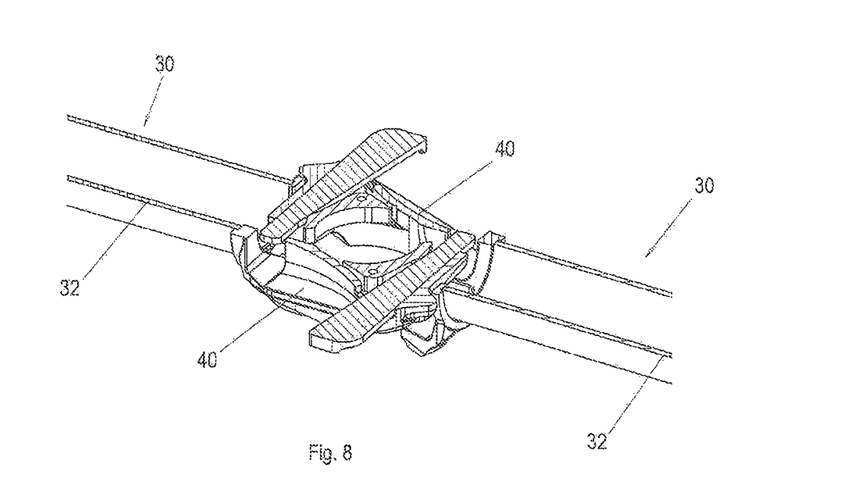
FIG. 8 is a schematic cross-sectional perspective view of the ledger assembly shown in FIG. 7.

FIG. 2 schematically illustrates a second exemplary embodiment of a node 2 of a scaffolding system 1. In this embodiment, the standard 10 is provided with multiple supporting projections 14 each defining a supporting surface 16 with a generally square waveform, again with a periodic length equal to about $\frac{1}{4}^{th}$ of the circumference of the tubular wall. The flanks 22 of the supporting surface 16 run parallel to the longitudinal axis $L_s$ of the standard and are sufficiently steep (relative to the horizontal) to prevent an extremity 34 of a ledger 30 trapped in a depression from being pushed out by a horizontal thrust.

The supporting projections 14 may preferably be provided on the standard 10 through plastic deformation of its tubular wall 12. Alternatively, a supporting projection 14 may be manufactured separately, and subsequently be slid onto and then connected, e.g. welded, to the tubular wall of the standard. This latter option, however, is more laborious and thus more costly.

In an embodiment, of which an example is shown in FIG. 1, each of the depressions 20 of a supporting projection 14 may be associated with a, typically stud-like, keeper projection 24. Like the supporting projection 14, the keeper projection 24 may preferably be formed by plastic deformation of the tubular wall 12 of the standard 10. Alternatively, it may be manufactured separately and later be connected, e.g. welded, to the outside of the tubular wall 12. When the standard 10 is in a vertical orientation, the keeper projection 24 may be located axially above the respective associated depression 20.

The keeper projection 24 is particularly useful in combination with a supporting projection 14 that defines a supporting surface 16 with gently sloping flanks 22 and relatively shallow depressions 20. Although such a supporting surface 16 presents an important improvement over the prior art in its ability to aid in selecting a nearby ledger mounting position (in the form of a depression), and in trapping the ledger extremity 34 at such a position, the rough treatment of a ledger 30 that is sometimes required to force it into place between two standards 10 may exceed the level of release-resistance that the supporting projection 14 is dimensioned to provide. Thus, in such cases, a yet unlocked and freely supported ledger extremity 34 may occasionally be pushed out of contact with the supporting projection 14.

This problem may be overcome by, on the one hand, associating a keeper projection 14 with each of the depressions 20 of a supporting projection 14, and, on the other hand, providing ledger couplings 40 (connected at ledger extremities 34) with a complementary provision in the form of a keeper projection recess or slot 78. Accordingly, when the ledger 30 is loosely coupled to the standard (e.g. supported on the supporting projection 14 of the standard 10, but not yet secured thereto) the keeper projection 14 may be received in the keeper projection recess 78 in order to define the rotational and/or translational position of the ledger coupling 40 relative to the standard 10.

The construction of a ledger 30, and of a ledger coupling 40 that is provided at an extremity thereof, will now be clarified below with reference to FIG. 3-8.

A ledger 30 may comprise an elongate tubular wall 32, having a central longitudinal axis $L_l$ and two opposite extremities 34. At least one of the extremities 34 may be provided with a ledger coupling 40 that is configured to connect the ledger extremity 34 to a standard 10. For clarity it is noted that in the embodiments of FIGS. 1 and 2, the ledger couplings 40 are designed such that two ledgers 30 can be connected in mutual engagement to a standard 10 at a same axial/vertical level, such that the central axes $L_l$ of the ledgers 30 are in line with each other (see also FIG. 7).

A ledger coupling 40 may comprise a foot 42, which may have a first side 44 that is (configured to be) fixedly connected to an extremity 34 of a ledger 30 associated with the coupling 40. To this end the first side 44 may define a foot ring 50. The foot 42 may further comprise two foot wings 52 lying opposite each other. Each foot wing 52 may be provided, on a side remote from the foot ring 50, with a foot support surface 48. The foot support surface 48, which thus lies at a second side 46 of the foot 42, opposite the first side 44, serves for abutment against an outside surface of the standard 10. With such a design, the first end 56 of a coupling hook 54 (to be described below) may be connected to both the foot ring 50 and the two foot wings 52. Between the two foot wings 52, a hook receiving space may be formed inside the foot 42, which space may provide a receiving possibility for a coupling hook 54 of a second, corresponding coupling 40 of a second ledger 30 that is to be connected to the standard 10 at the same level.

An important aspect of the foot 42 of the coupling 40 depicted in FIGS. 3-8 is the outer contour 49 of each of its wings 52, in particular near the second side 46 of the foot 42. It is understood that the foot 42 may be configured to be supported on the supporting surface 16 of a supporting projection 14 of a standard 10 as shown in FIG. 1. More in particular, the foot 42 may be configured to enable sliding off of elevations 18 of the supporting surface 16, along the flanks 22 thereof, towards a state of stable reception in a flanked depression 20 of the supporting surface 16. To this end, a foot wing 52 of the coupling 40 may have a contour 49 complementary to a flanked depression 20 of the supporting surface 16, such that at least a part of the foot 42 may be fittingly received in said flanked depression 20, and preferably such that—in a fully received state—the contour 49 only contacts the flanks 22 while remaining clear of the depression 20 itself. Smooth, generally convex contour shapes are preferred to facilitate movement of the foot 42 towards and into a depression 20.

Figure 9:
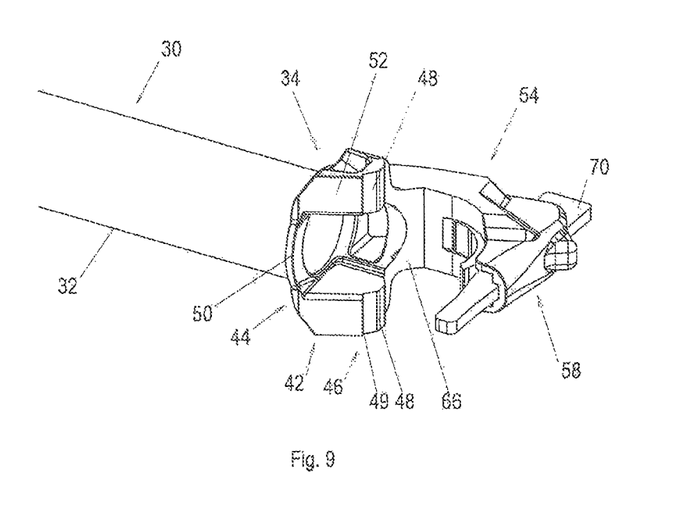
FIG. 9 is a schematic perspective view of a second exemplary embodiment of a ledger extremity fitted with a ledger coupling suitable for use with the supporting projections of the standard shown in FIG. 2.

In the embodiment of the coupling 40 shown in FIGS. 3-8, the contour 49 of a foot wing 52 includes two opposite, convexly tapering sides for engagement with the flanks 22 of a depression 20, and a convex, slightly flattened apex designed to remain clear of the depression 20 itself. By way of example, FIG. 9 shows an alternative embodiment of a ledger coupling 40 that is configured for cooperation with the supporting projections 14 on the standard 10 shown in FIG. 2. The contour 49 of the foot wing 52 shown in FIG. 9 includes two straight, parallel sides for engagement with the flanks 22 of a square depression 20 of the supporting surface 16 shown in FIG. 2, and a straight tip for contact with the depression 20 itself.

A coupling 40 may further comprise a coupling hook 54, which may be connected at a first end 56 to the foot 42. The coupling hook 54 may form a coupling hook support surface 60 which, together with the foot support surface 48, may define a substantially semi-circular standard receiving surface 48, 60. The radius of the standard receiving surface 48, 60 may substantially correspond to an outer diameter of a standard 10. The substantially semi-circular standard receiving surface 48, 60 may define a standard receiving space 62 having a central axis A which, with the coupling 40 in a condition coupled to a standard 10, may substantially coincide with the central axis of the standard $L_s$. Together with the foot 42, the coupling hook 54 may define a standard inlet 64 via which a standard 10 can be introduced into the standard receiving space 62.

The coupling 40 may further comprise a locking element 66 which may be hingedly connected to the coupling hook 54 about a pivot 68. The pivot 68 may extend parallel to the central axis A of the standard receiving space 62. The locking element 66 may have a locking position in which the standard inlet 64 is blocked by the locking element 66. The locking element 66 may further have a releasing position in which the standard inlet 62 is released for letting a standard 10 into or taking it out of the standard receiving space 62. The locking element 66 may have, on a side proximal to the standard receiving space 62, a substantially circular segmental locking support surface 76. An imaginary center of the circular segmental locking support surface 76 may coincide with the central axis A of the standard receiving space 62. In the embodiment of FIGS. 3-8, the locking element 66 is designed such that it automatically enters into the locking position when a standard 10 is pressed completely into the standard receiving space 62. This effect is obtained in that the locking element 66 extends on two sides of the pivot 68, while both sides can engage on a standard 10.

The coupling 40 may also comprise a wedge 70, which may be slideably connected to the coupling hook 54, and which, in a securing position, may engage the locking element 66 and hold this locking element 66 in the locking position. In an alternative embodiment of the coupling 40, the wedge 70 may be replaced by a bolt (not shown), which may be screwingly (instead of slideably, as with the wedge) inserted into a threaded recess in the coupling hook 54 in order to engage the locking element 66 and hold it in its locking position.

The coupling 40 may additionally comprise a first wedge recess 72 in the coupling hook 54 adjacent the second end 58 of the coupling hook 54 that is remote from the first extremity 56 of the coupling hook 54 connected to the foot 42. The wedge 70 may be slideably but not removably received in the wedge recess 72. Such a design has as an advantage that when erecting a scaffolding frame, the wedge 70 cannot come loose from the coupling 40, so that it is always at hand. Furthermore, the wedge 70 falling on a bystander or a fellow scaffolding builder is thus prevented. Moreover, striking the wedge 70 into place allows a rapid, secure connection of a ledger 30 to a standard 10. The uncoupling of a ledger 30 can be realized rapidly too by knocking the wedge 70 loose.

The coupling 40 may further comprise a second wedge recess 74, which may be provided in the coupling hook 54 adjacent the first extremity 46. The second wedge recess 74 may be configured to enable the passage of a wedge 70 of a second, corresponding coupling 40 of a second ledger 30 which is connected at the same level to the standard 10. It is highly advantageous that ledgers 30 can be connected to a standard 10 at a same axial/vertical level, because then, floor parts 4 that are placed on the ledgers 30 may extend at the same level. This is highly beneficial to safety.

In one embodiment, which is preferred from a point of view of production and rigidity and strength, the foot 42 and the coupling hook 54 may be designed integrally as one single casting.

Figure 10:
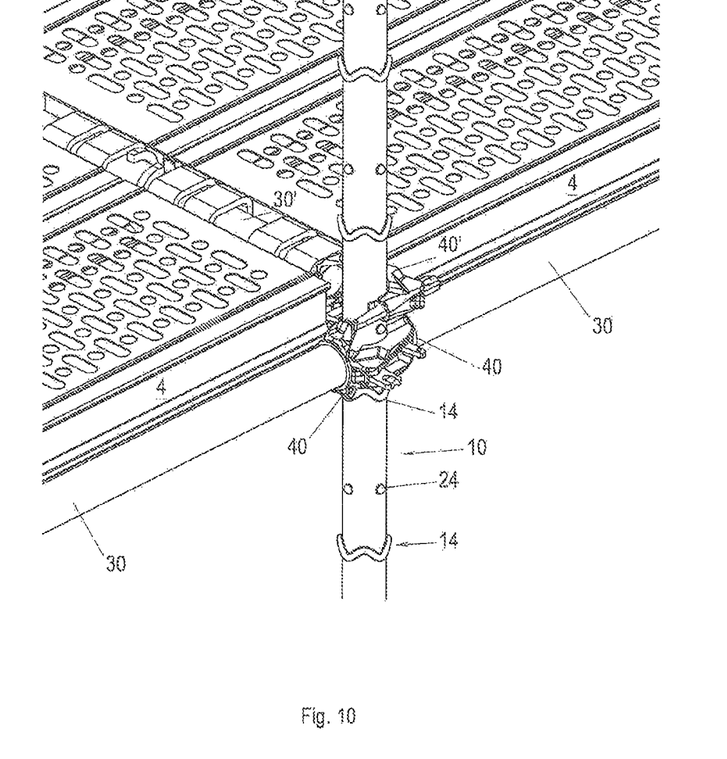
FIG. 10 is a schematic perspective view of a node including a standard with two aligned ledgers and one transverse ledger, and having floor parts arranged on the latter.

Finally, FIG. 10 shows a node of a scaffold frame, including two longitudinally aligned ledgers 30 and one transversely arranged ledger 30', all of which are connected to a standard 10. The depicted coupling 40' of the transverse ledger 30' rests on the couplings 40 of the two longitudinally aligned ledgers 30, which are in mutual engagement at the same vertical level. The two couplings 40 themselves are supported on the supporting surface 16 of a supporting projection 14 of the standard 10, such that their feet 42 are stably arranged in opposite depressions thereof. On the second ledger 30, floor parts 4 are placed.

Although illustrative embodiments of the present invention have been described above, in part with reference to the accompanying drawings, it is to be understood that the invention is not limited to these embodiments. Variations to the disclosed embodiments can be understood and effected by those skilled in the art in practicing the claimed invention, from a study of the drawings, the disclosure, and the appended claims. Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, it is noted that particular features, structures, or characteristics of one or more embodiments may be combined in any suitable manner to form new, not explicitly described embodiments.

LIST OF ELEMENTS 1 scaffolding system
2 node
4 floor part
10 standard
12 tubular wall of standard/standard tube
14 supporting projection
16 supporting surface
18 elevation/gravitational potential hill
20 depression/gravitational potential valley
22 flank
24 keeper projection
30 ledger
32 tubular wall of ledger/ledger tube
34 extremity of ledger
40 ledger coupling
42 foot
44 first side of foot
46 second side of foot
48 foot support surface
49 contour of foot support surface
50 foot ring
52 foot wing
54 coupling hook
56 first end of coupling hook
58 second end of coupling hook
60 coupling hook support surface
62 standard receiving space
64 standard inlet
66 locking element
68 pivot
70 wedge
72 first wedge recess in coupling hook
74 second wedge recess in coupling hook
76 locking support surface
78 keeper projection recess
A central axis of standard receiving space
$L_s$ longitudinal central axis of standard
$L_l$ longitudinal central axis of ledger
$R_s$ radial direction with respect to longitudinal axis of standard $T_s$ tangential direction with respect to longitudinal axis of standard

The invention claimed is:

1. A standard of a scaffolding system, comprising:
an elongate tubular wall, having a central longitudinal axis;
a plurality of substantially identical supporting projections that are regularly spaced apart along the longitudinal axis of the standard and that protrude radially outwardly from said tubular wall,
wherein each supporting projection is a plastic deformation in the tubular wall and defines an annular supporting surface that is an integral part of the tubular wall and encircles the tubular wall and that, seen in a tangential direction relative to the longitudinal axis, when the standard is in a vertical orientation, defines alternating elevations and depressions, and wherein each of the elevations or depressions of the supporting surface of the supporting projection is associated with a keeper projection that is a plastic deformation in the tubular wall and that is an integral part of the tubular wall.

2. The standard according to claim 1, wherein the alternating elevations and depressions of the annular supporting surface define a periodic waveform.

3. The standard according to claim 2, wherein the periodic waveform is a generally sinusoidal or triangular waveform.

4. The standard according to claim 2, wherein the supporting surface defines a generally square waveform.

5. The standard according to claim 2, wherein the elevation-to-depression amplitude of the waveform is at least 0.5 cm.

6. The standard according to claim 2, wherein the distance between two consecutive elevations, as seen in the tangential direction with respect to the longitudinal axis of the standard, is at least 3 cm.

7. The standard according to claim 1, wherein each of the keeper projections is located axially above the respective associated elevation or depression when the standard is in a vertical use orientation.

8. The standard according to claim 1, wherein the supporting surface defines at least two depressions.

9. The standard according to claim 1, wherein two depressions of said alternating elevations and depressions of the supporting surface of the supporting projection are mutually offset in the tangential direction by n·90 degrees, n being a positive integer in the range of 1-3.

10. The standard according to claim 8, wherein the supporting surface defines four depressions.

11. Scaffolding system, comprising:
at least one standard according to claim 1; and
at least one ledger comprising:
an elongate tubular wall, having a central longitudinal axis;
at least one ledger coupling, connected to the elongate tubular wall at an extremity thereof;
characterized in that the ledger coupling includes a foot that is configured to be supported on the supporting surface of a supporting projection of said at least one standard, and that has a contour complementary to an elevation or depression of the supporting surface, such that the foot may be at least partially fittingly received on or in said elevation or depression, respectively.

12. The scaffolding system according to claim 11, wherein the foot of the ledger coupling includes a keeper projection recess, which is configured to fittingly receive a keeper projection associated with said elevation or depression of said supporting surface of said supporting projection of said at least one standard when the foot is at least partially fittingly received on or in said elevation or depression, respectively.

13. Scaffolding system, comprising at least one standard including:
an elongate tubular wall, having a central longitudinal axis;
a plurality of substantially identical supporting projections that are regularly spaced apart along the longitudinal axis of the standard and that protrude radially outwardly from said tubular wall,
wherein each supporting projection is a plastic deformation in the tubular wall and defines an annular supporting surface that is an integral part of the tubular wall and encircles the tubular wall and that, seen in a tangential direction relative to the longitudinal axis, when the standard is in a vertical orientation, defines alternating elevations and depressions; and
at least one ledger comprising:
an elongate tubular wall, having a central longitudinal axis;
at least one ledger coupling, connected to the elongate tubular wall at an extremity thereof;
characterized in that the ledger coupling includes a foot that is configured to be supported on the supporting surface of a supporting projection of the plurality of supporting projections, and wherein the foot has a contour complementary to an elevation or depression of the supporting surface, such that the foot may be at least partially fittingly received on or in said elevation or depression, respectively.

14. Method for erecting a scaffolding frame, including:
providing a scaffolding system according to claim 11 or claim 13;
arranging the standard in a substantially vertical orientation; and
supporting the ledger coupling of the ledger on the supporting surface of the at least one supporting projection of the standard, thereby allowing gravity to slide the contour of the foot into fitting engagement with an elevation or depression of said supporting surface.

* * * * *